United States Patent
Tsuji et al.

(10) Patent No.: US 11,370,441 B2
(45) Date of Patent: Jun. 28, 2022

(54) VEHICLE, AND CONTROL APPARATUS AND CONTROL METHOD THEREOF

(71) Applicant: HONDA MOTOR CO., LTD., Tokyo (JP)

(72) Inventors: Kanta Tsuji, Wako (JP); Atsushi Ishioka, Wako (JP); Nozomu Hirosawa, Wako (JP); Haruhiko Nishiguchi, Wako (JP); Takafumi Hirose, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 16/775,724

(22) Filed: Jan. 29, 2020

(65) Prior Publication Data
US 2020/0247416 A1 Aug. 6, 2020

(30) Foreign Application Priority Data

Feb. 5, 2019 (JP) .............................. JP2019-018824

(51) Int. Cl.
*B60Q 1/34* (2006.01)
*B60W 10/04* (2006.01)
*B60W 10/20* (2006.01)
*B60W 30/18* (2012.01)
*B60W 50/10* (2012.01)

(52) U.S. Cl.
CPC ....... *B60W 30/18163* (2013.01); *B60Q 1/343* (2013.01); *B60W 10/04* (2013.01); *B60W 10/20* (2013.01); *B60W 2710/20* (2013.01); *B60W 2720/10* (2013.01)

(58) Field of Classification Search
CPC .......... B60W 30/18163; B60W 10/04; B60W 10/20; B60W 2710/20; B60W 2720/10; B60W 50/10; B60W 2540/20; B60Q 1/343
USPC ......................................................... 701/26
See application file for complete search history.

(56) References Cited

U.S. PATENT DOCUMENTS

| 10,266,109 | B2  |   | 4/2019 | Fujii |          |
|------------|-----|---|--------|-------|----------|
| 2015/0075954 | A1 | * | 3/2015 | Mizuno .................... | B60Q 1/42 200/61.3 |
| 2018/0178714 | A1 |   | 6/2018 | Fujii |          |
| 2020/0223440 | A1 | * | 7/2020 | Takahashi .............. | G08G 1/167 |
| 2020/0269747 | A1 | * | 8/2020 | Kusayanagi ........... | B60K 35/00 |

FOREIGN PATENT DOCUMENTS

| JP | 2016071514 A | * | 5/2016 |
| JP | 2018-103767 A |   | 7/2018 |

* cited by examiner

*Primary Examiner* — Abby Y Lin
*Assistant Examiner* — Hossam M Abd El Latif
(74) *Attorney, Agent, or Firm* — Thomas | Horstemeyer, LLP

(57) ABSTRACT

A position to which a turn signal lever can be moved includes a neutral position, middle positions, and end positions. A detection unit detects a start request of a lane change operation based on the turn signal lever having been operated to the middle position in one of two different directions, and detects a cancellation request of the lane change operation based on the turn signal lever having been operated to the middle position in the other of the two different directions during the execution of the lane change operation.

9 Claims, 7 Drawing Sheets

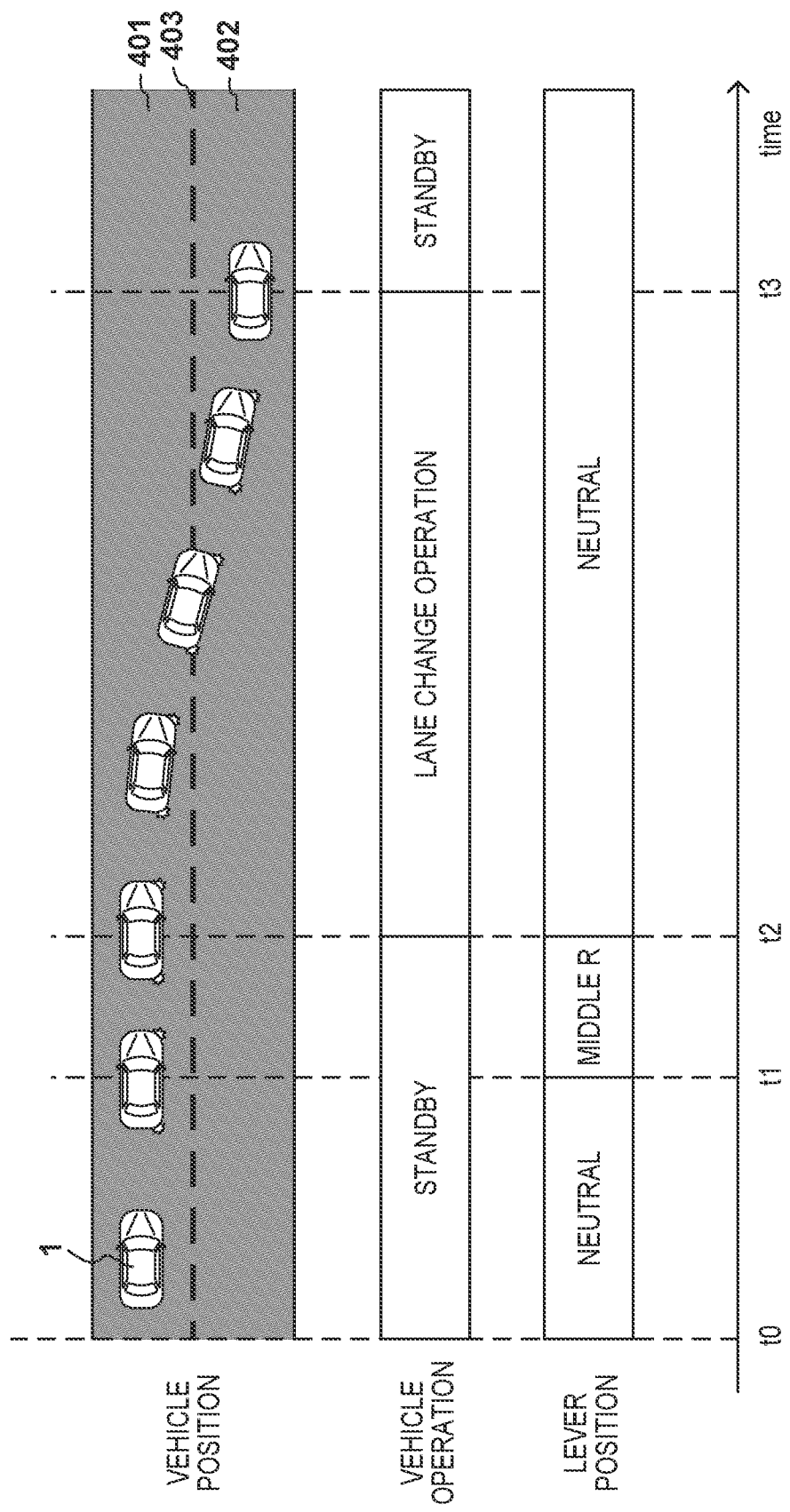

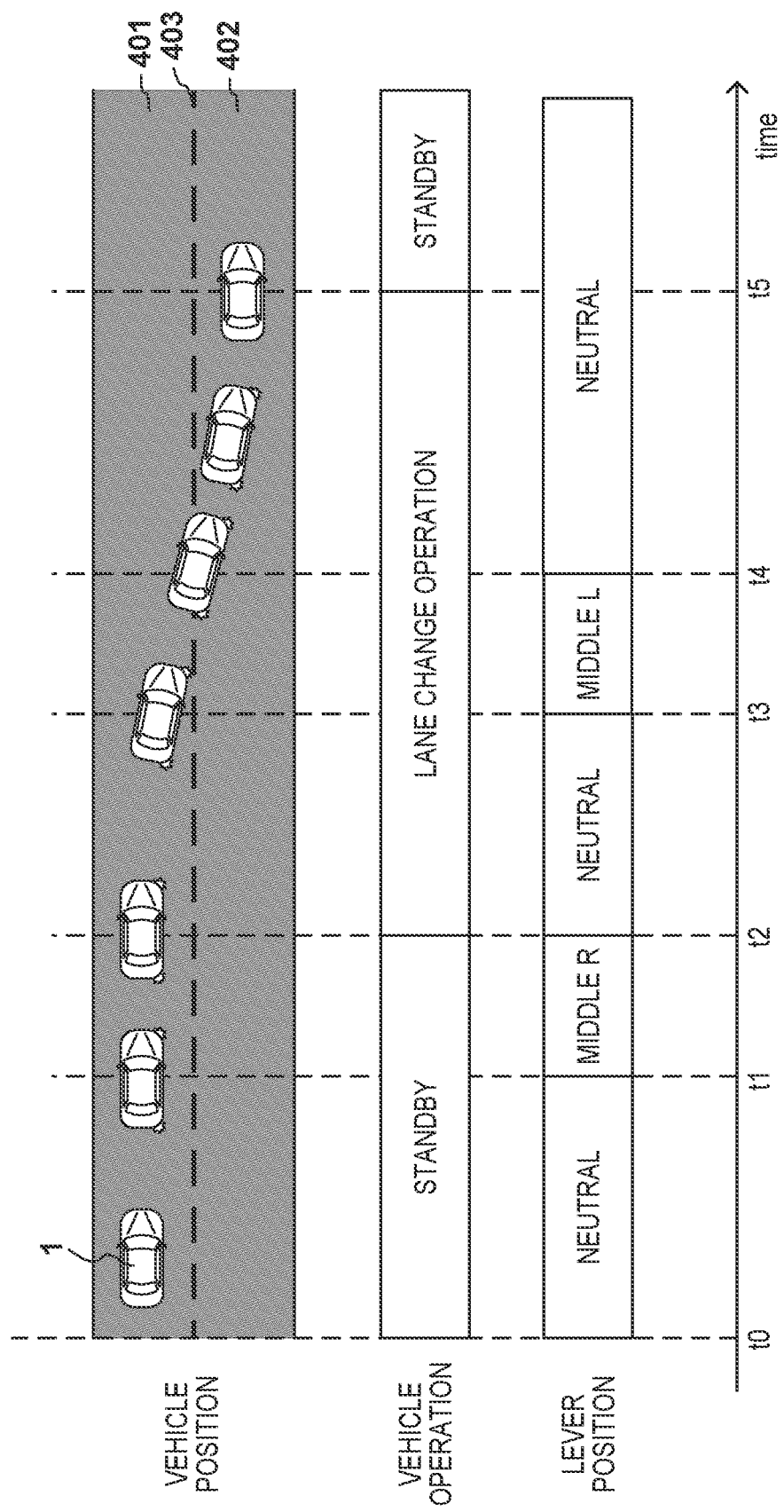

VEHICLE, AND CONTROL APPARATUS AND CONTROL METHOD THEREOF

CROSS-REFERENCE TO RELATED APPLICATION

This application claims priority to and the benefit of Japanese Patent Application No. 2019-018824 filed on Feb. 5, 2019, the entire disclosure of which is incorporated herein by reference.

BACKGROUND OF THE INVENTION

Field of the Invention

The present invention relates to a vehicle, and a control apparatus and control method thereof.

Description of the Related Art

As a function of automated driving and driving support of a vehicle, there is provided a function for the vehicle to change lanes without an operation by a driver. Japanese Patent Laid-Open No. 2018-103767 discloses that a request to start a lane change support operation is detected when a driver operates a turn signal lever and a request to cancel the lane change support operation is detected when the driver operates the turn signal lever in the opposite direction.

SUMMARY OF THE INVENTION

In the technique disclosed in Japanese Patent Laid-Open No. 2018-103767, the request to start the lane change support operation is detected when the driver performs a shallow pressing operation on the turn signal lever, and the request to cancel the lane change support operation is detected when the driver performs a deep pressing operation on the turn signal lever in the opposite direction. If the amount of operation of the turn signal lever is asymmetrical in this manner, it may confuse the driver when he/she is to make the lane change support cancellation request. An aspect of the present invention provides a technique that allows a driver to intuitively make a request to cancel a lane change operation.

According to an embodiment, a control apparatus of a vehicle, the apparatus comprising: a detection unit configured to detect, based on an operation of a turn signal lever by a driver, a start request to start a lane change operation and a cancellation request to cancel the lane change operation; and a travel control unit configured to control the lane change operation based on the start request and the cancellation request, wherein a position to which the turn signal lever can be moved includes a neutral position, first positions which are in two different directions from each other with respect to the neutral position, and from which the turn signal lever will return to the neutral position in a case in which an operation force on the turn signal lever from the driver is absent, and second positions which are in the two different directions from each other with respect to the neutral position, have a larger amount of movement from the neutral position than the first positions, and are positions at which the turn signal lever can be maintained in the case in which the operation force on the turn signal lever from the driver is absent, and the detection unit detects the start request based on the turn signal lever having been operated to the first position in one of the two different directions, and detects the cancellation request based on the turn signal lever having been operated to the first position in the other of the two different directions during the execution of the lane change operation is provided.

BRIEF DESCRIPTION OF THE DRAWINGS

FIG. 4 is a schematic view for explaining an example in which the lane change operation is completed according to the embodiment;

FIG. 6 is a schematic view for explaining an example in which the lane change operation is not canceled according to the embodiment.

DESCRIPTION OF THE EMBODIMENTS

Figure 1:
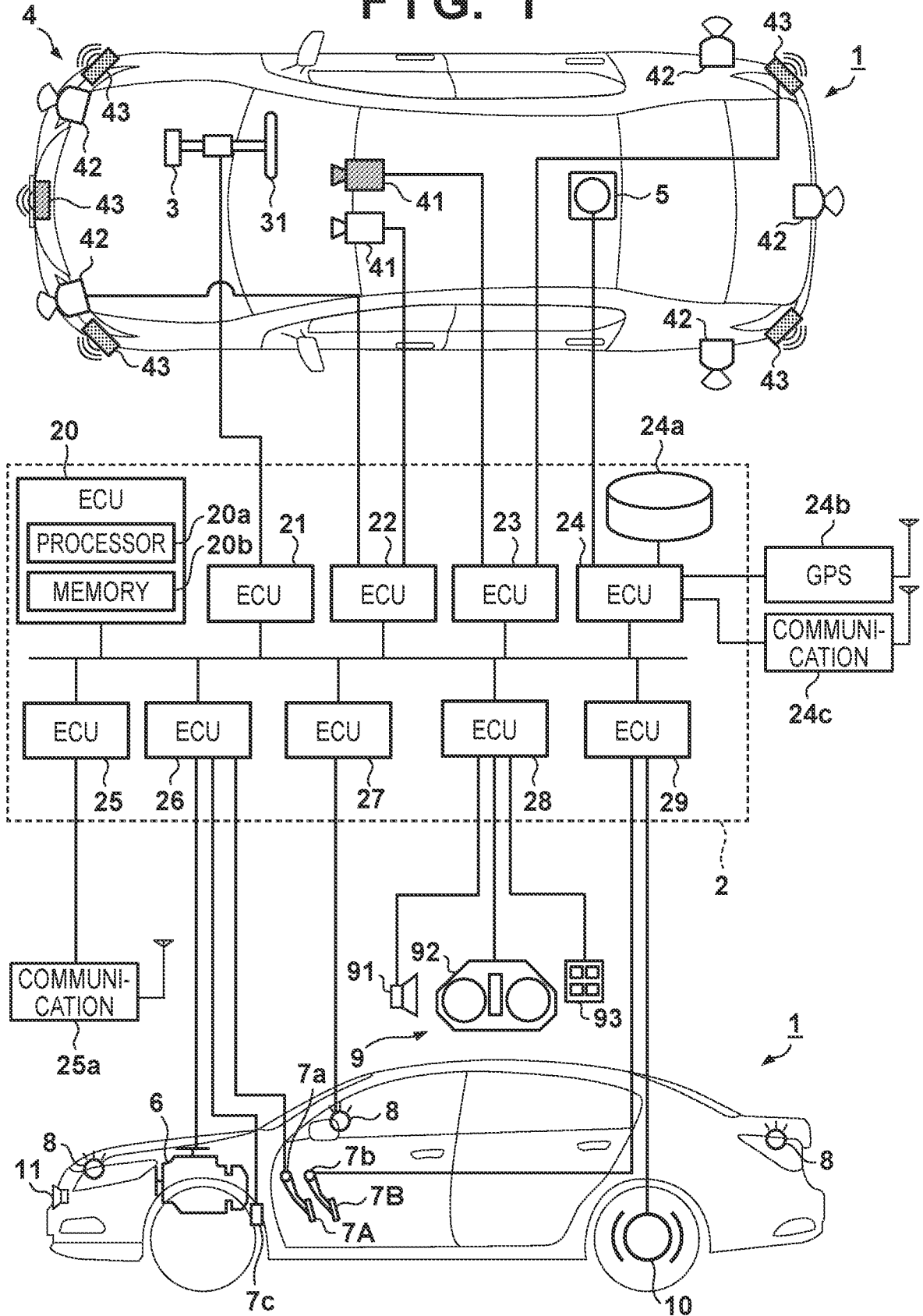
FIG. 1 is a block diagram for explaining an example of the arrangement of a vehicle according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

A vehicle 1 includes a vehicle control apparatus 2 (to be simply referred to as the control apparatus 2 hereinafter) that controls the vehicle 1. The control apparatus 2 includes a plurality of ECUs 20 to 29 communicably connected by an in-vehicle network. Each ECU functions as a computer which includes a processor represented by a CPU, a memory such as a semiconductor memory, an interface with an external device, and the like. The memory stores programs to be executed by the processor, data to be used by the processor for processing, and the like. Each ECU may include a plurality of processors, memories, and interfaces. For example, the ECU 20 includes a processor 20a and a memory 20b. Processing by the ECU 20 is executed by the processor 20a executing an instruction included in a program stored in the memory 20b. Alternatively, the ECU 20 may include a dedicated integrated circuit such as an ASIC or the like to execute processing by the ECU 20. Other ECUs may be arranged in a similar manner.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted. The detection unit 42 is a LIDAR (Light Detection and Ranging) (to be sometimes referred to as the LIDAR 42 hereinafter), and detects a target around the vehicle 1 or measures the distance to a target. In this embodiment, five LIDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, and radars are provided, the peripheral environment of the vehicle can be analyzed from various aspects.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination. The ECU 24, the map information database 24a, and the GPS sensor 24b form a so-called navigation device.

The ECU 25 includes a communication device 25a for inter-vehicle communication. The communication device 25a performs wireless communication with another vehicle in the periphery and exchanges information between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices 8 (lighting instruments such as headlights, taillights, and the like) including direction indicators (turn signals). In the example shown in FIG. 1, the lighting devices 8 are provided in the front portion, door mirrors, and the rear portion of the vehicle 1. The ECU 27 further includes a sound device 11 including a horn or the like directed to the outside of the vehicle. The lighting devices 8, the sound device 11, or a combination of them has a function of providing information to the outside of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified. An input device 93 is a switch group that is arranged in a position where the driver can perform an operation, is used to issue an instruction to the vehicle 1, and may also include a voice input device. The ECU 28 can perform a guidance operation related to the travel control by the ECU 20. The details of the guidance operation will be described later. The input device 93 can include a switch used to control the travel control operation by the ECU 20. The input device 93 can include a camera for detecting the direction of the line of sight of the driver.

The ECU 29 controls a brake device 10 and a parking brake (not shown). The brake device 10 is, for example, a disc brake device which is provided for each wheel of the vehicle 1 and decelerates or stops the vehicle 1 by applying resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

Figure 2:
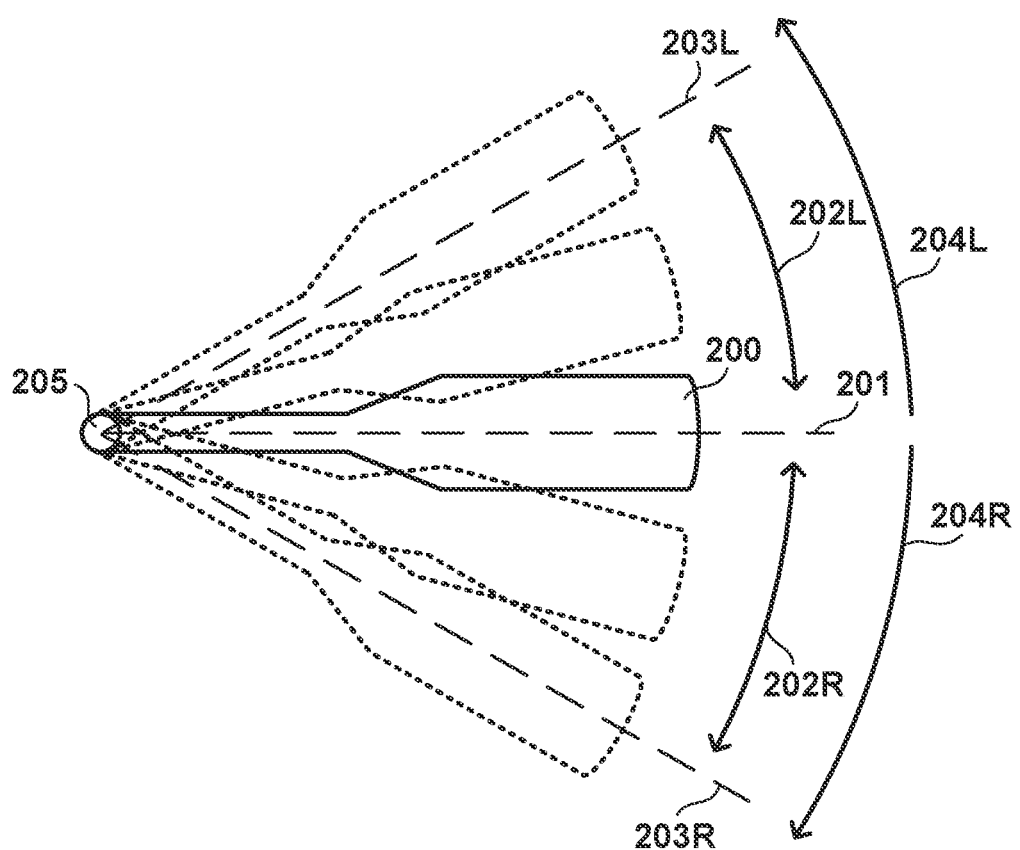
FIG. 2 is a schematic view for explaining an example of the arrangement of a turn signal lever according to the embodiment.

An example of the arrangement of a turn signal lever 200 of the vehicle 1 will be described with reference to FIG. 2. The turn signal lever 200 is attached near (for example, the right-side rear portion of) the steering wheel 31, and is used by the driver to instruct the vehicle 1 to make a turn signal blink or stop blinking. In addition, as will be described later, the turn signal lever 200 is also used by the driver to make a lane change operation start request and a lane change operation cancellation request to the vehicle 1. The operation of the turn signal lever 200 by the driver is detected by, for example, the ECU 27.

Directions in which the turn signal lever 200 can be moved include a clockwise direction 204R and a counterclockwise direction 204L about a shaft 205. The clockwise direction 204R and the counterclockwise direction 204L are merely an example of two directions which are different from each other. The directions in which the turn signal lever 200 can be moved may also include directions toward and away from the driver.

Positions to which the turn signal lever 200 can be moved include a neutral position 201, middle positions 202R and 202L, and end positions 203R and 203L. The neutral position 201 is a position where the turn signal lever 200 is placed when the driver is not instructing the vehicle 1.

The middle position 202R is a position in the clockwise direction 204R with respect to the neutral position 201. The middle position 202L is a position in the counterclockwise direction 204L with respect to the neutral position 201. If there is no operation force from the driver when the turn signal lever 200 is at one of the middle positions 202R and 202L, the turn signal lever 200 will be returned to the neutral position 201 by a physical biasing mechanism. Each of the middle positions 202R and 202L can be called a half position. Each of the middle positions 202R and 202L can be a position that has a predetermined width as shown in FIG. 2.

The end position 203R is a position in the clockwise direction 204R with respect to the neutral position 201. The end position 203L is a position in the counterclockwise direction 204L with respect to the neutral position 201. If there is no operation force from the driver when the turn signal lever 200 is at one of the end positions 203R and 203L, the turn signal lever 200 can be maintained at the position by a physical lock mechanism. Each of the end positions 203R and 203L can be called a stuck position.

The amount of movement from the neutral position 201 to the end position 203R is greater than the amount of movement from the neutral position 201 to the middle position 202R. In other words, the middle position 202R is between the neutral position 201 and the end position 203R. There may be play between the middle position 202R and the neutral position 201. That is, in a case in which the turn signal lever 200 is within a predetermined amount of movement from the neutral position 201, the ECU 27 may assume that the turn signal lever 200 is not in the middle position 202R. In a similar manner, there may be play between the middle position 202R and the end position 203R. The relationship between the neutral position 201 and the middle position 202L and the relationship between the neutral position 201 and the end position 203L are the same as the relationship between the neutral position 201 and the middle position 202R and the relationship between the neutral position 201 and the end position 203R described above.

In a case in which the driver wants to make the right-side turn signal of the vehicle 1 blink, the driver will operate the turn signal lever 200 to the end position 203R. The ECU 27 will make the right-side turn signal of the vehicle 1 blink in accordance with this operation. On the other hand, if the driver wants to make the left-side turn signal of the vehicle 1 blink, the driver will operate the turn signal lever 200 to the end position 203L. The ECU 27 will make the left-side turn signal of the vehicle 1 blink in accordance with this operation.

A control method of the vehicle 1 for performing a lane change operation will be described with reference to FIGS. 3A and 3B. In this control method, the control apparatus (more specifically, the ECU 20) of the vehicle 1 will detect a request to start or a request to cancel a lane change operation based on the driver's operation of the turn signal lever 200, and control the lane change operation of the vehicle 1 based on the detected start request or cancellation request. As will be described more specifically hereinafter, the driver will operate the turn signal lever 200 to the middle position 202R in a case in which he/she wants make a lane change to an adjacent lane on the right side, and the driver will operate the turn signal lever 200 to the middle position 202L in a case in which he/she wants to make a lane change to an adjacent lane on the left side. Furthermore, the driver can make a request to cancel the lane change operation by operating the turn signal lever 200 to the opposite-side middle position 202L or 202R.

Figure 3A:
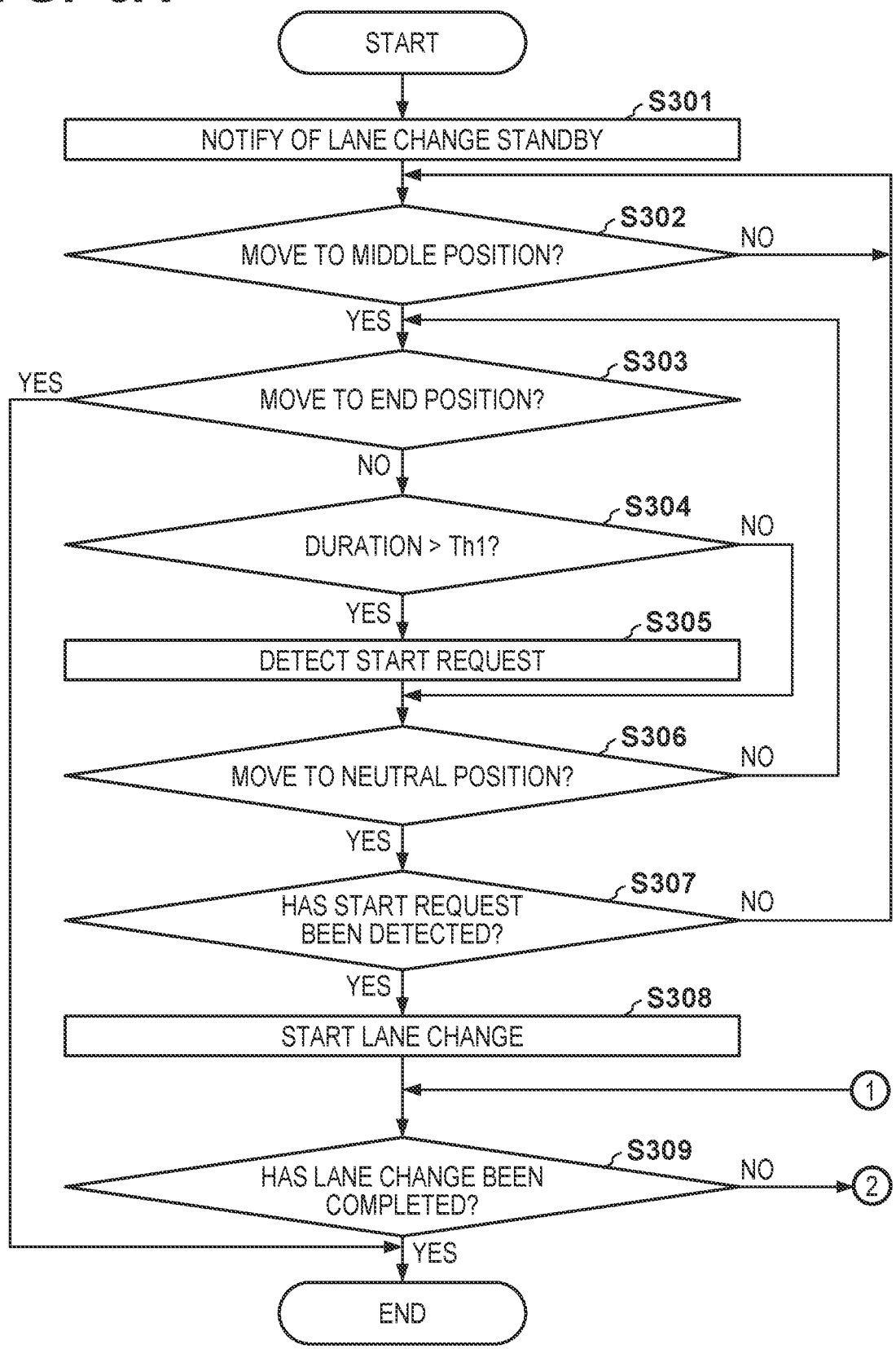
FIGS. 3A and 3B are flowcharts for explaining the control method of a lane change operation according to the embodiment.
Figure 3B:
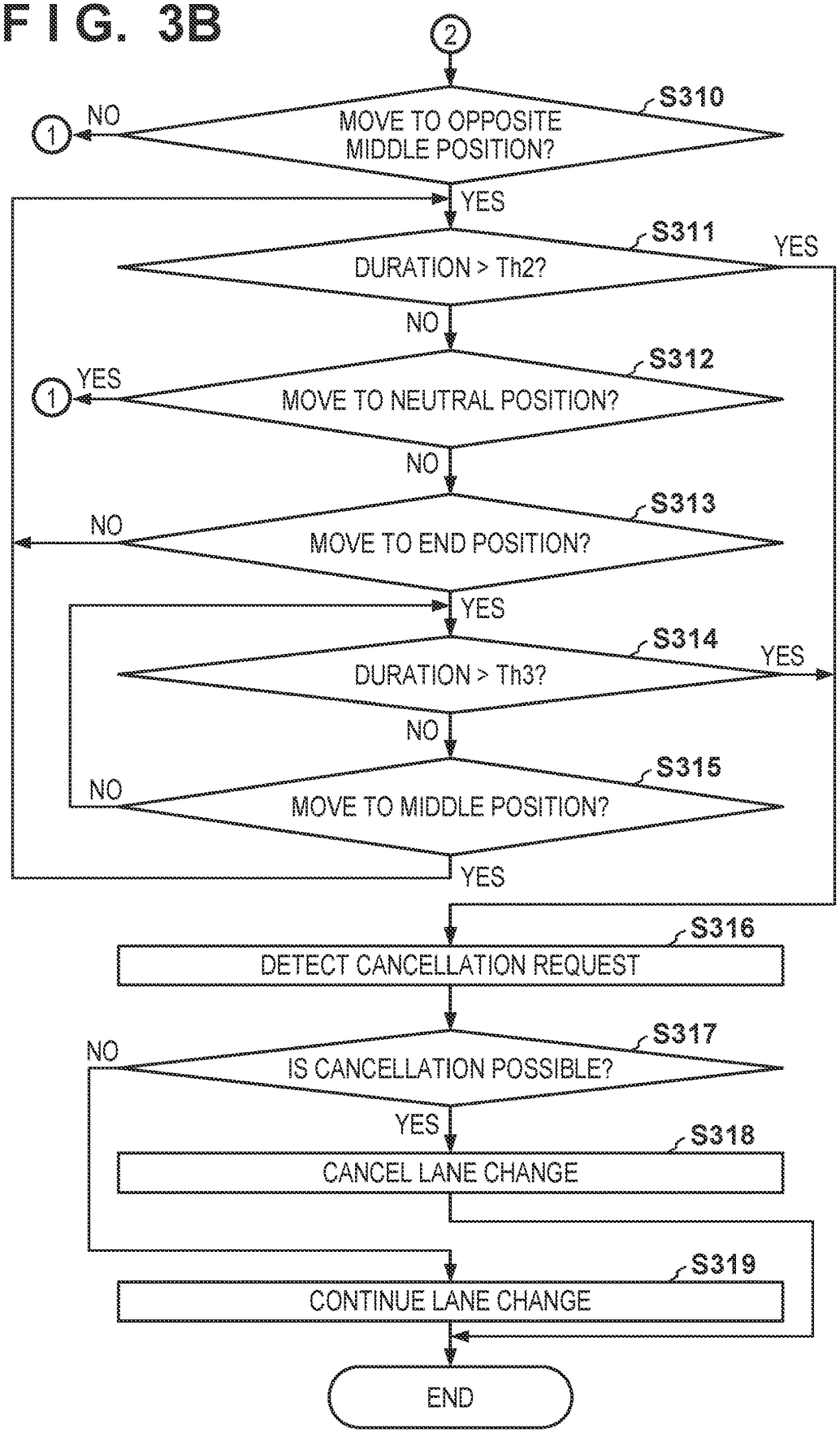

The control method shown in FIGS. 3A and 3B can be performed by the processor 20a of the ECU 20 executing a program stored in the memory 20b. Alternatively, some or all of the processes of the method may be executed by a dedicated circuit such as an ASIC (Application-Specific Integrated Circuit). In the case of the former, the processor 20a will be the component for a specific operation, and in the case of the latter, the dedicated circuit will be the component for a specific operation.

The control method of FIGS. 3A and 3B is started in response to the ECU 20 determining, based on the peripheral environment of the vehicle 1, that the lane change operation of the vehicle 1 can be executed. Assume that the turn signal lever 200 is in the neutral position 201 at the start of control method. If the peripheral environment changes during the execution of this control method and it becomes impossible to execute the lane change operation, the ECU 20 will end this control method and perform an operation corresponding to the peripheral environment. For example, the ECU 20 may consider the safety and either remain in the current travel lane or move to an adjacent lane.

In step S301, the ECU 20 notifies the driver that a lane change operation can be executed. This notification is performed by, for example, changing the display contents of the display device 92. After the notification, the ECU 20 will shift to a lane change standby state to wait for a start request from the driver.

In step S302, the ECU 20 determines whether the turn signal lever 200 has been operated to the middle position 202R or 202L. If the turn signal lever 200 has been operated to the middle position 202R or 202L (YES in step S302), the ECU 20 shifts the process to step S303. Otherwise (NO in step S302), the process shifts to step S302. In this manner, the ECU 20 will wait for the turn signal lever 200 to be operated to the middle position 202R or 202L which is in one of the clockwise direction 204R and the counterclockwise direction 204L from the neutral position 201. For the sake of descriptive convenience hereinafter, assume that the turn signal lever 200 has moved to the middle position 202R in step S302. In a case in which the turn signal lever 200 has moved to the middle position 202L in step S302, the clockwise direction 204R and the counterclockwise direction 204L are to be switched in the following description. The ECU 27 may make the corresponding turn signal start blinking in response to the fact that the turn signal lever 200 has been operated to the middle position 202R or 202L.

In step S303, the ECU 20 determines whether the turn signal lever 200 has been operated to the end position 203R. If the turn signal lever 200 has been operated to the end position 203R (YES in step S303), the ECU 20 ends the processing. Otherwise (NO in step S303), the process shifts to step S304. In a case in which the turn signal lever 200 has moved to the end position 203R, the ECU 20 will determine that the driver will manually make a lane change to the adjacent lane (in this case, the adjacent lane on the right side). Thus, the ECU 20 will end the automatic lane change operation.

In step S304, the ECU 20 determines whether the duration in which the turn signal lever 200 is maintained at the middle position 202R (by the driver) is longer than a threshold time Th1 (for example, 2 sec). If the duration in which the turn signal lever 200 is maintained at the middle position 202R is longer than the threshold time Th1 (YES in step S304), the ECU 20 shifts the process to step S305. Otherwise (NO in step S304), the process shifts to step S306.

In step S305, the ECU 20 detects a request to start the lane change operation. In this manner, the lane change operation start request is detected based on the fact that the turn signal lever 200 has been operated to the middle position 202R and the fact that the duration from the operation is longer than the threshold time Th1 (for example, 2 sec). At this point, only the start request is detected, and the lane change operation will not be started yet.

In step S306, the ECU 20 determines whether the turn signal lever 200 has moved to the neutral position 201. If the turn signal lever 200 has moved to the neutral position 201 (YES in step S306), the ECU 20 shifts the process to step S307. Otherwise (NO in step S306), the process shifts to step S303.

In step S307, the ECU 20 determines whether the lane change operation start request has been detected in step S305. If the lane change operation start request has been detected in step S305 (YES in step S307), the ECU 20 shifts the process to step S308. Otherwise (NO in step S307), the process shifts to step S302.

In step S308, the ECU 20 starts the lane change operation. In this manner, the lane change operation is started based on the fact that the lane change operation start request has been detected and the fact that the turn signal lever 200 has moved from the middle position 202R to the neutral position 201 (because the driver has removed his/her hand from turn signal lever 200). Since the lane change operation will be started based on the condition that the turn signal lever 200 has returned to the neutral position 201, it will be easier for the driver to grasp the start timing of the lane change operation. Also, since the lane change operation will be started in a state in which the driver is not operating the turn signal lever 200, it will be easier for the driver to monitor the periphery and intervene when necessary.

On the other hand, the lane change operation will not be started in a case in which the duration in which the turn signal lever 200 has been maintained at the middle position 202R is shorter than the threshold time Th1. This is because if the turn signal lever 200 is operated in such a short period, it may simply be an erroneous operation. Hence, the ECU 20 can accurately grasp the intention of the driver by comparing the duration in which the turn signal lever 200 is maintained at the middle position 202R with the threshold time Th1.

In step S309, the ECU 20 determines whether the lane change operation has been completed. If the lane change operation has been completed (YES in step S309), the ECU 20 ends the processing. Otherwise (NO in step S309), the process shifts to step S310. For example, the ECU 20 may determine that the lane change operation has been completed when the vehicle 1 has moved to the vicinity of the center of the adjacent lane (the lane change destination lane) or may determine that the lane change operation has been completed when the vehicle 1 has crossed the division line between the current travel lane and the adjacent lane by a predetermined ratio or more. The ECU 27 will make the turn signal stop blinking in response to the completion of the lane change operation.

In step S310, the ECU 20 determines whether the turn signal lever 200 has been operated to the middle position 202L on the opposite side. If the turn signal lever 200 has been operated to the middle position 202L on the opposite side (YES in step S310), the ECU 20 shifts the process to step S311. Otherwise (NO in step S310), the process shifts to step S309. In this manner, the ECU 20 will wait for the turn signal lever 200 to be operated to the middle position 202L on the opposite side or for the lane change operation to be completed.

In step S311, the ECU 20 determines whether the duration in which the turn signal lever 200 has been maintained at the middle position 202L (by the driver) is longer than a threshold time Th2. If the duration in which the turn signal lever 200 has been maintained at the middle position 202L is longer than the threshold time Th2 (YES in step S311), the ECU 20 shifts the process to step S316. Otherwise (NO in step S311), the process shifts to step S312. The duration in which the turn signal lever 200 has been maintained in the middle position 202L is the duration from the most recent switch to the middle position 202L to the point of the determination. The threshold time Th2 is set to be shorter than the threshold time Th1 and is, for example, 1.5 sec. By setting, as a condition for detecting a cancellation request, the fact that the turn signal lever has been maintained at the middle position on the opposite side for the threshold time Th2 or more, it is possible to suppress excessive detection that can occur when the turn signal lever 200 has moved to the opposite side in a case in which the driver has excessively operated the turn signal lever 200 while trying to return the turn signal lever to the neutral position 201.

In step S312, the ECU 20 determines whether the turn signal lever 200 has moved to the neutral position 201. If the turn signal lever 200 has moved to the neutral position 201 (YES in step S312), the ECU 20 shifts the process to step S309. Otherwise (NO in step S312), the process shifts to step S313. In this manner, in a case in which the turn signal lever 200 has returned to the neutral position 201 before the elapse of threshold time Th2 after the turn signal lever 200 has been operated to the middle position 202L, the ECU 20 will wait for the turn signal lever 200 to move again to the middle position 202L or for the lane change operation to be completed.

In step S313, the ECU 20 determines whether the turn signal lever 200 has been operated to the end position 203L. If the turn signal lever 200 has been operated to the end position 203L (YES in step S313), the ECU 20 shifts the process to step S314. Otherwise (NO in step S313), the process shifts to step S311.

In step S314, the ECU 20 determines whether the duration in which the turn signal lever 200 has been maintained at the end position 203L (by the lock mechanism) is longer than a threshold time Th3 (for example, 0.1 sec). If the duration in which the turn signal lever 200 has been maintained at the end position 203L is longer than the threshold time Th3 (YES in step S314), the ECU 20 shifts the process to step S316. Otherwise (NO in step S314), the process shifts to step S315. The duration in which the turn signal lever 200 has been maintained at the end position 203L is the duration from the most recent switch to the end position 203L to the point of the determination. The threshold time Th3 may be shorter than the threshold time Th2.

In step S315, the ECU 20 determines whether the turn signal lever 200 has been operated to the middle position 202L. If the turn signal lever 200 has been operated to the middle position 202L (YES in step S315), the ECU 20 shifts the process to step S311. Otherwise (NO in step S315), the process shifts to step S314.

In step S316, the ECU 20 detects that the driver has made a request to cancel the lane change operation during the execution of the lane change operation. In this manner, a cancellation request is detected based on the fact that the turn signal lever 200 has been operated to the middle position 202L during the execution of the lane change operation and the fact that the duration in which the turn signal lever has been maintained at the middle position 202L is longer than the threshold time Th2. Since the operation performed to make a request to start the lane change operation and the operation performed to make a request to cancel the lane change operation become symmetrical to each other, the driver will be able to intuitively make a request to cancel the lane change operation. In addition, since the cancellation request can be made at the middle position 202L, the driver's intention to cancel the operation can be detected more quickly.

Furthermore, the ECU 20 will detect the cancellation request based on the fact that the turn signal lever 200 has been operated to the end position 203L during the execution of the lane change operation and the fact that the duration in which the turn signal lever has been maintained at the end position 203L is longer than the threshold time Th3. Since the cancellation request can be detected under the same logic as that of the detection of the start request, there is consistency between the start and cancellation operations. Also, since the threshold time Th3 is shorter than the threshold time Th2, the driver can make the cancellation request in a shorter period of time. The value of the threshold time Th3 may be zero. In this case, a cancellation request will be detected immediately in response to the operation of the turn signal lever 200 to the end position 203L.

In step S317, the ECU 20 determines whether the lane change operation can be canceled. If the lane change operation can be canceled (YES in step S317), the ECU 20 shifts the process to step S318. Otherwise (NO in step S317), the process shifts to step S319. For example, the ECU 20 may determine whether the lane change operation can be canceled based on the progress of the lane change operation. More specifically, the ECU 20 may determine that the lane change operation can be canceled in a case in which the vehicle 1 has remained in the travel lane. On the other hand, the ECU 20 may determine that the lane change operation cannot be canceled in a case in which the vehicle 1 is straddling the white line between the travel lane and the adjacent lane. In a case in which the lane change operation is progressing in this manner, it is conceivable that the succeeding vehicle of the vehicle 1 is traveling under the assumption that the vehicle 1 is performing a lane change operation. Hence, it is safer for the vehicle 1 to complete the lane change operation than to return to its original travel lane.

In step S318, the ECU 20 cancels the lane change operation, maintains traveling in the original travel lane, and ends the processing. The ECU 27 may make the turn signal stop blinking at the point when the lane change operation has been canceled. In step S319, the ECU 20 completes the lane change operation and ends the processing. The ECU 27 may make the turn signal stop blinking at the point when the lane change operation has been completed.

In the control method described above, whether the duration in which the turn signal lever 200 is maintained at the middle position 202R is longer than the threshold time Th1 was determined in step S304 while the turn signal lever 200 is at the middle position 202R. Alternatively, whether the duration in which the turn signal lever 200 has been maintained at the middle position 202R is longer than the threshold time Th1 can be determined after the turn signal lever 200 has moved from the middle position 202R to the neutral position 201. For example, instead of performing the processes of steps S304 and S305 between step S303 and step S306, these processes can be performed between step S306 and step S307.

In the control method described above, the threshold time Th2, which is used to detect a cancellation request before a threshold time Th4 has elapsed from the start of the lane change operation in step S308, may be longer than the threshold time Th2, which is used to detect a cancellation request after the threshold time Th4 has elapsed from the start of the lane change operation in step S308. More specifically, the threshold time Th2 which is used to detect the cancellation request before the threshold time Th4 has elapsed from the start of the lane change operation in step S308 may be, for example, 1 sec. The threshold time Th2 which is used to detect the cancellation request after the threshold time Th4 has elapsed from the start of the lane change operation in step S308 may be 0.5 sec. The threshold time Th4 may be, for example, 0.5 sec. As a result, it is possible to suppress excessive detection that can occur when the turn signal lever 200 has moved to the opposite side due to an excessive operation.

In the control method described above, in addition to or instead of the step S317, the ECU 20 may make the cancellation request detection condition stricter as the lane change operation progresses. For example, as the lane change operation progresses, the ECU 20 may prolong the threshold time Th2, increase the amount of movement from the neutral position 201 that can be defined as the middle position 202L, require a greater scanning speed of the turn signal lever 200, increase the load required for the operation of the turn signal lever 200, or require an arbitrary combination of these conditions. The sense of incongruity given the driver can be reduced by employing an arrangement in which a cancellation request becomes more difficult to make as the lane change operation progresses in this manner.

Figure 5:
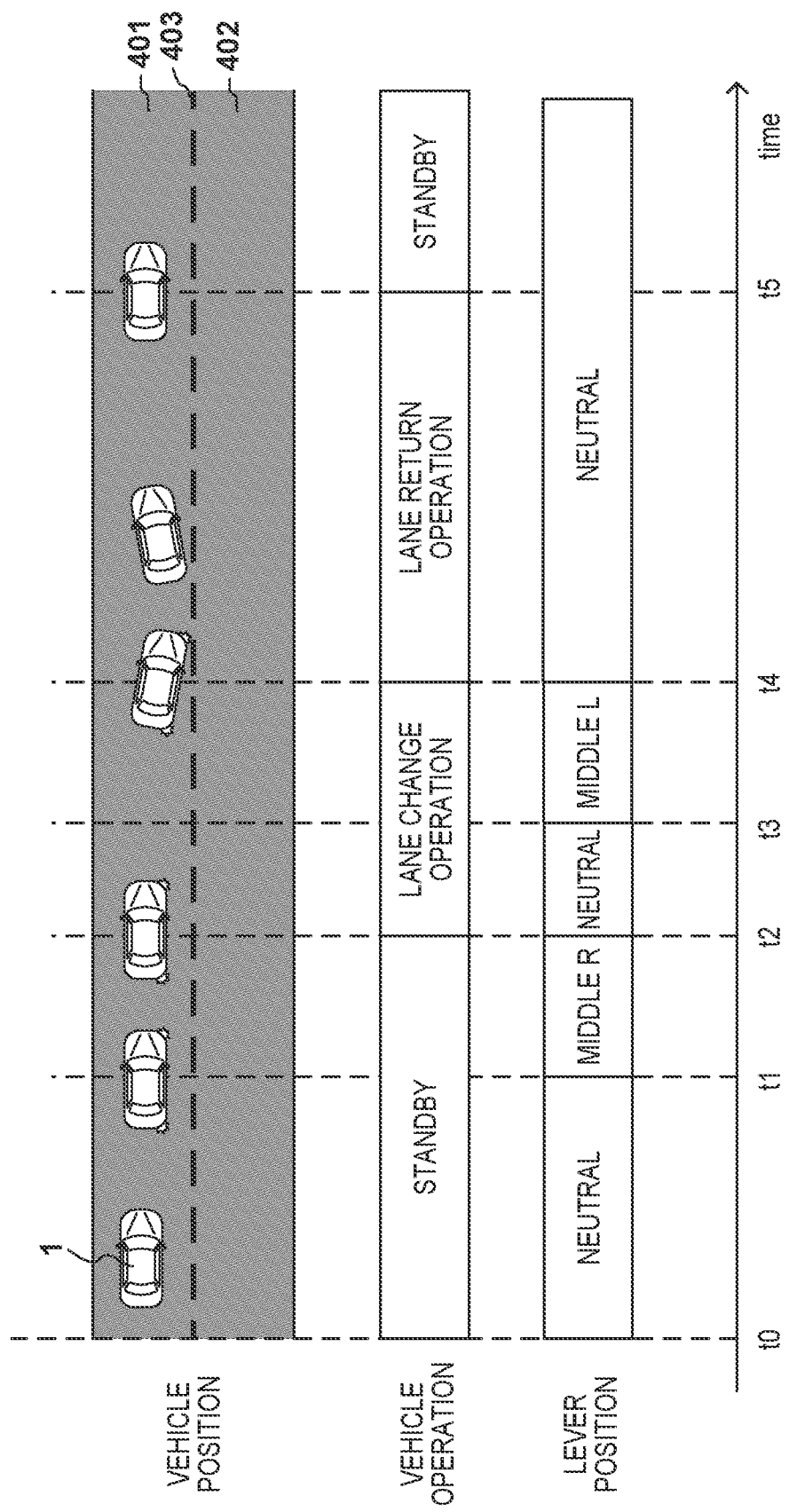
FIG. 5 is a schematic view for explaining an example in which the lane change operation is canceled according to the embodiment.

A plurality of scenarios of the lane change operation will be described with reference to FIGS. 4 to 6. In FIGS. 4 to 6, a "vehicle position" indicates the position of travel of the vehicle 1. The vehicle 1 is traveling on a lane 401. A lane 402 is adjacent to the right side of the lane 401. A white line 403 is drawn between the lane 401 and the lane 402. A "vehicle operation" indicates the operation performed by the vehicle. A "lever position" indicates the position of the turn signal lever 200.

FIG. 4 describes a scenario in which the driver does not make a cancellation request after he/she has made the lane change operation start request. The control method of FIGS. 3A and 3B is started at time t0. At time t1, the driver operates the turn signal lever 200 to the middle position 202R (YES in step S302). At time t2, the driver removes his/her hand from the turn signal lever 200, and the turn signal lever 200 moves to the neutral position 201 (YES in step S306). Assume that the time from time t1 to time t2 is longer than the threshold time Th1 (YES in step S304). Hence, the ECU 20 starts the lane change operation (step S308). At time t3, the ECU 20 completes the lane change operation (YES in step S309). As a result, the control method of FIGS. 3A and 3B ends.

FIG. 5 describes a scenario in which the cancellation request is accepted when the driver has made the cancellation request after he/she has made the lane change operation start request. Since the processes up to time t2 are the same as those of the scenario shown in FIG. 4, a description will be omitted. At time t3, the driver operates the turn signal lever 200 to the middle position 202L (YES in step S310). At time t4, the duration in which the turn signal lever 200 has been maintained at the middle position 202L exceeds the threshold time Th2 (YES in step S311). At this point, the vehicle 1 is not straddling the white line 403, and the vehicle 1 has remained in the lane 401. Hence, the ECU 20 determines that the lane change operation can be canceled (YES in step S317) and cancels the lane change operation (step S318). At time t5, the vehicle 1 returns to the center of the lane 401.

FIG. 6 describes a scenario in which the cancellation request is not accepted when the driver has made the cancellation request after he/she has made the lane change operation start request. Since the processes up to time t4 are the same as those of the scenario shown in FIG. 5, a description will be omitted. At the point of time t4, the vehicle 1 is straddling the white line 403. Hence, the ECU 20 determines that the lane change operation cannot be canceled (NO in step S317) and continues the lane change operation (Step S319). At time t5, the vehicle 1 completes the lane change operation.

<Summary of Embodiment>
<Arrangement 1>

There is provided a control apparatus (20) of a vehicle (1), the apparatus comprising:

a detection unit configured to detect, based on an operation of a turn signal lever (200) by a driver, a start request to start a lane change operation and a cancellation request to cancel the lane change operation; and a travel control unit configured to control the lane change operation based on the start request and the cancellation request, wherein a position to which the turn signal lever can be moved includes a neutral position (201), first positions (202R, 202L) which are in two different directions from each other with respect to the neutral position, and from which the turn signal lever will return to the neutral position in a case in which an operation force on the turn signal lever from the driver is absent, and second positions (203R, 203L) which are in the two different directions from each other with respect to the neutral position, have a larger amount of movement from the neutral position than the first positions, and are positions at which the turn signal lever can be maintained in the case in which the operation force on the turn signal lever from the driver is absent, and the detection unit detects the start request based on the turn signal lever having been operated to the first position in one of the two different directions, and detects the cancellation request based on the turn signal lever having been operated to the first position in the other of the two different directions during the execution of the lane change operation.

According to this arrangement, since the operation performed to make a lane change operation start request and the operation performed to make a lane change operation cancellation request are symmetrical to each other, it is possible for the driver to intuitively make the lane change operation cancellation request. Also, since a cancellation request can be made at the middle position, the driver's intention to cancel the operation can be detected more quickly.

<Arrangement 2>

There is provided the apparatus according to arrangement 1, wherein the detection unit detects the start request based on a duration in which the turn signal lever is maintained in the first position in the one of the two different directions being longer than a first threshold time (Th1), and the travel control unit starts the lane change operation based on the start request having been detected and a fact that the turn signal lever having moved from the first position in the one of the two different directions to the neutral position.

According to this embodiment, since the lane change operation will be started based on the condition that the turn signal lever has returned to the neutral position, it will be easier for the driver to grasp the start timing of the lane change operation. Also, since the lane change operation will be started in a state in which the driver is not operating the turn signal lever, it will be easier for the driver to monitor the periphery and intervene when necessary.

<Arrangement 3>

There is provided the apparatus according to arrangement 1 or 2, wherein the detection unit detects the cancellation request based on a duration in which the turn signal lever is maintained at the first position in the other of the two different directions during the execution of the lane change operation being longer than a second threshold time (Th2), and the second threshold time, which is used to detect the cancellation request before a third threshold time (Th4) has elapsed since the start of the lane change operation, is longer than the second threshold time used to detect the cancellation request after the third threshold time has elapsed since the start of the lane change operation.

According to this arrangement, it is possible to suppress excessive detection that can occur when the turn signal lever has moved to the opposite side due to an excessive operation.

<Arrangement 4>

There is provided the apparatus according to any one of arrangements 1 to 3, wherein the detection unit makes a detection condition of the cancellation request stricter in accordance with the progress of lane change operation.

According to this arrangement, the sense of incongruity given to the driver can be reduced by employing an arrangement in which a cancellation request becomes more difficult to make in accordance with the progress of the lane change operation.

<Arrangement 5>

There is provided the apparatus according to any one of arrangements 1 to 4, wherein in a case in which the cancellation request is detected, the travel control unit determines whether to cancel the lane change operation based on progress of the lane change operation.

According to this arrangement, safety will improve by allowing the vehicle to complete the lane change operation when the lane change operation has progressed.

<Arrangement 6>

There is provided the apparatus according to any one of arrangements 1 to 5, wherein the detection unit detects the cancellation request based on a duration in which the turn signal lever has been maintained in the first position in the other of the two directions during the execution of the lane change operation being longer than a second threshold time, the detection unit further detects the cancellation request based on a duration in which the turn signal lever has been maintained in the second position in the other of the two different directions during the execution of the lane change operation being longer than a fourth threshold time (Th3), and the fourth threshold time is shorter than the second threshold time.

According to this arrangement, consistency is created between the start and cancellation operations because the cancellation request can be detected under the same logic as that of the detection of the start request.

<Arrangement 7>

There is provided a vehicle comprising a control apparatus defined any one of arrangements 1 to 6.

According to this arrangement, the present invention is provided in the form of a vehicle.

<Arrangement 8>

There is provided a control method of a vehicle (1), the method comprising:

detecting (S305), based on an operation of a turn signal lever (200) by a driver, a start request to start a lane change operation and a cancellation request to cancel the lane change operation; and controlling (S308, S318, S319) the lane change operation based on the start request and the cancellation request, wherein a position to which the turn signal lever can be moved includes a neutral position (201), first positions (202R, 202L) which are in two different directions from each other with respect to the neutral position, and from which the turn signal lever will return to the neutral position in a case in which an operation force on the turn signal lever from the driver is absent, and second positions (203R, 203L) which are in the two different directions from each other with respect to the neutral position, have a larger amount of movement from the neutral position than the first positions, and are positions at which the turn signal lever can be maintained in the case in which the operation force on the turn signal lever from the driver is absent, and the detecting includes detecting (S302) the start request based on the turn signal lever having been operated to the first position in one of the two different directions, and detecting (S310) the cancellation request based on the turn signal lever having been operated to the first position in the other of the two different directions during the execution of the lane change operation.

According to this arrangement, since the operation performed to make a lane change operation start request and the operation performed to make a lane change operation cancellation request are symmetrical to each other, it is possible for the driver to intuitively make the lane change operation cancellation request. Also, since a cancellation request can be made at the middle position, the driver's intention to cancel the operation can be detected more quickly.

<Arrangement 9>

There is provided a non-transitory storage medium storing a program that causes a computer to function as each unit of a control apparatus defined in any one of arrangements 1 to 6.

According to this embodiment, the present invention is provided in the form of a program.

The invention is not limited to the foregoing embodiments, and various variations/changes are possible within the spirit of the invention.

What is claimed is:

1. A control apparatus of a vehicle, the apparatus comprising:

at least one processor circuit with a memory comprising instructions, that when executed by the processor circuit, cause the at least one processor circuit to at least:

detect, based on an operation of a turn signal lever by a driver, a start request to start a lane change operation and a cancellation request to cancel the lane change operation; and control the lane change operation based on the start request and the cancellation request, wherein a position to which the turn signal lever can be moved includes a neutral position, a plurality of first positions which are in two different directions from each other with respect to the neutral position, and from which the turn signal lever will return to the neutral position in a case in which an operation force on the turn signal lever from the driver is absent, and a plurality of second positions which are in the two different directions from each other with respect to the neutral position, have a larger amount of movement from the neutral position than the first positions, and are positions at which the turn signal lever can be maintained in the case in which the operation force on the turn signal lever from the driver is absent, and the instructions, that when executed by the processor circuit, further cause the at least one processor circuit to:

detect the start request based on the turn signal lever having been operated to the first position in one of the two different directions, and detect the cancellation request based on a duration in which the turn signal lever is maintained at the first position in the other of the two different directions during the execution of the lane change operation being longer than a first threshold time.

2. The apparatus according to claim 1, wherein the instructions, that when executed by the processor circuit, further cause the at least one processor circuit to:

detect the start request based on a duration in which the turn signal lever is maintained in the first position in the one of the two different directions being longer than a second threshold time; and start the lane change operation based on the start request having been detected and the turn signal lever having moved from the first position in the one of the two different directions to the neutral position.

3. The apparatus according to claim 1, wherein the first threshold time, which is used to detect the cancellation request before a third threshold time has elapsed since the start of the lane change operation, is longer than the first threshold time used to detect the cancellation request after the third threshold time has elapsed since the start of the lane change operation.

4. The apparatus according to claim 1, wherein the instructions, that when executed by the processor circuit, further cause the at least one processor circuit to:

in a case where the lane change operation is in a first degree of progress, detect the cancellation request if a first detection condition is met, and in a case where the lane change operation is in a second degree of progress, detect the cancellation request if a second detection condition is met, the second degree being higher than the first degree, and the second detection condition being more difficult to meet than the first detection condition.

5. The apparatus according to claim 1, wherein in a case in which the cancellation request is detected, the instructions, that when executed by the processor circuit, further cause the at least one processor circuit to determine whether to cancel the lane change operation based on progress of the lane change operation.

6. The apparatus according to claim 1, wherein
the instructions, that when executed by the processor circuit, further cause the at least one processor circuit to detect the cancellation request based on a duration in which the turn signal lever has been maintained in the second position in the other of the two different directions during the execution of the lane change operation being longer than a fourth threshold time, and
the fourth threshold time is shorter than the first threshold time.

7. A vehicle comprising the control apparatus defined in claim 1.

8. A control method of a vehicle, the method comprising:
detecting, based on an operation of a turn signal lever by a driver, a start request to start a lane change operation and a cancellation request to cancel the lane change operation; and
controlling the lane change operation based on the start request and the cancellation request,
wherein a position to which the turn signal lever can be moved includes
a neutral position,
a plurality of first positions which are in two different directions from each other with respect to the neutral position, and from which the turn signal lever will return to the neutral position in a case in which an operation force on the turn signal lever from the driver is absent, and
a plurality of second positions which are in the two different directions from each other with respect to the neutral position, have a larger amount of movement from the neutral position than the first positions, and are positions at which the turn signal lever can be maintained in the case in which the operation force on the turn signal lever from the driver is absent, and
the detecting includes
detecting the start request based on the turn signal lever having been operated to the first position in one of the two different directions, and
detecting the cancellation request based on a duration in which the turn signal lever is maintained at the first position in the other of the two different directions during the execution of the lane change operation being longer than a first threshold time.

9. A non-transitory storage medium storing a program that causes a computer to function as the control apparatus defined in claim 1.

* * * * *